April 15, 1930.                A. R. THOMPSON                1,754,584
                       METHOD OF STERILIZING CANNED GOODS
                    Filed Sept. 29, 1920      3 Sheets-Sheet 2
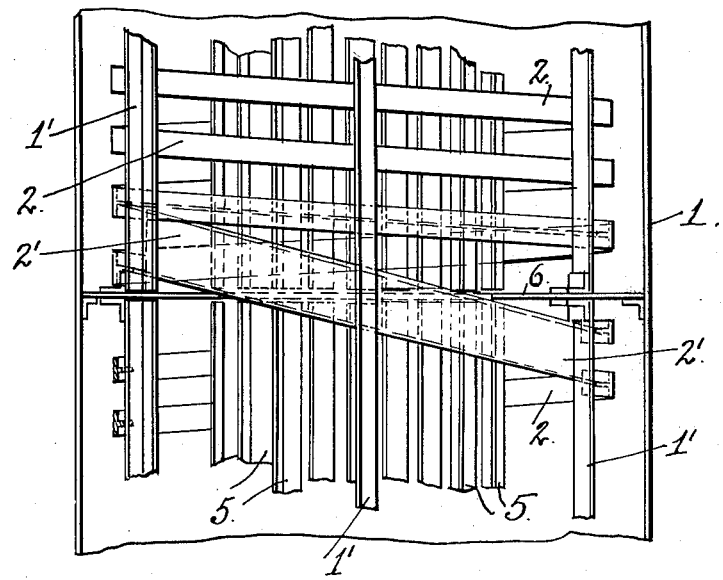
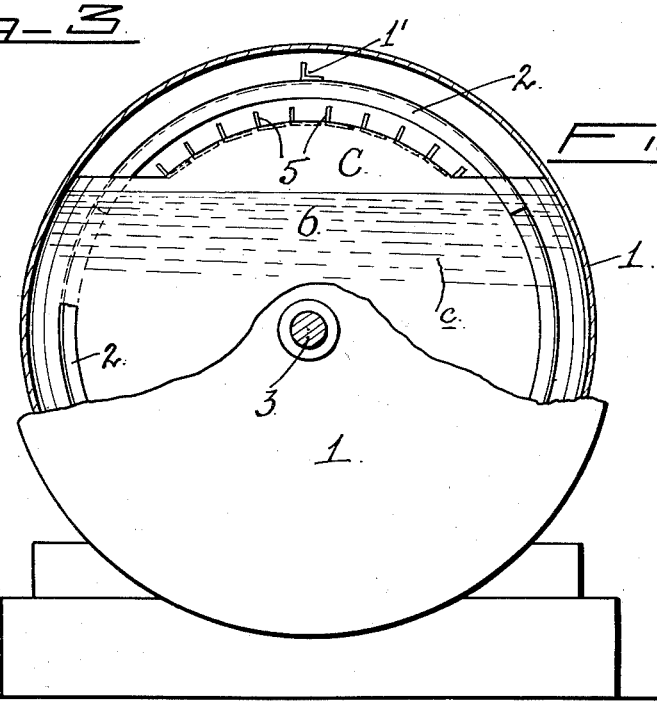
WITNESS                                        INVENTOR
                                             Albert R. Thompson
                                          BY
                                             Booth & Booth
                                                      ATTORNEYS April 15, 1930. A. R. THOMPSON 1,754,584
METHOD OF STERILIZING CANNED GOODS
Filed Sept. 29, 1920   3 Sheets-Sheet 3

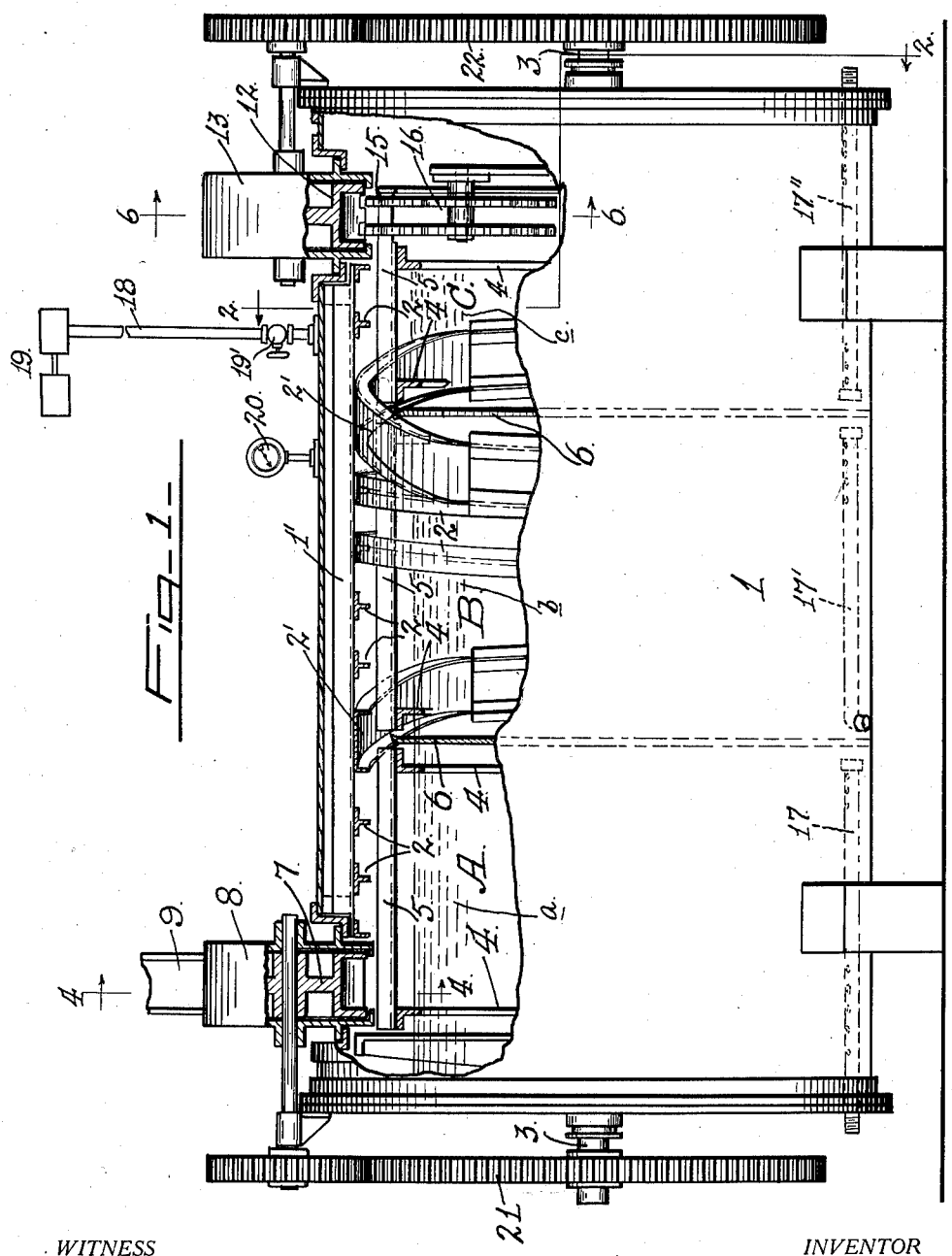

WITNESS
Wm F. Drew

INVENTOR
Albert R. Thompson
BY Booth & Booth
ATTORNEYS

Patented Apr. 15, 1930

1,754,584

UNITED STATES PATENT OFFICE

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA

METHOD OF STERILIZING CANNED GOODS

Application filed September 29, 1920. Serial No. 413,588.

My invention relates to the art of sterilizing canned goods. Commodities, according to their nature, require different temperatures, and different times of cook.

Also many commodities after being cooked in their cans require to be cooled as part of the sterilizing process. Cooking under pressure greater than atmospheric is common; and, it is also usual, after the canned goods have been subjected to the cooking process in one machine, to transfer them to a separate cooler, which is under atmospheric pressure.

As far as I am aware, cooking under pressure greater than atmospheric, whether the pressure is the result of a confined fluid heating medium, such as steam, or is due to a body of compressed air overlying a liquid heating-medium, such as water, has been heretofore conducted in a single chamber in which the goods, relatively slowly rise to the sterilizing temperature, thereby unnecessarily prolonging their time of cook; and, as far as I know, the subsequent cooling of the cans has always been effected in a chamber at atmospheric pressure, which operation especially with goods sterilized under pressure above atmospheric and at relatively high temperature, (such goods, for example, as corn) has the serious disadvantage of causing the seams of the cans to open, and thus ruin their contents.

One object of my invention is to provide a method of cooking under pressure, in accordance with which the goods are rapidly raised to the sterilizing temperature, and are then held constant at said temperature for the required duration of cook, thereby economizing time.

Another object is to provide a method of sterilizing according to which the goods are cooked under pressure and are cooled under pressure without having been relieved from pressure between the cooking and cooling; thereby avoiding the tendency of the cans to open their seams or burst.

A third object is to provide a method comprising both features above stated in one continuous operation.

The nature of my invention will fully appear from the following description in connection with the accompanying drawings which illustrate an apparatus in which my method may be carried out.

No claims are herein made to this apparatus, as it forms the subject-matter of a separate application filed contemporaneously herewith under date of September 29, 1920, and Serial Number 413,587.

In these drawings—

Fig. 1 is a side view, broken, and partly in vertical longitudinal section, of the apparatus.

Fig. 2 is an end view of the same, partly in section on the line 2—2 of Fig. 1.

Fig. 3 is a top plan view looking down on the interior of the sterilizing shell or box in the vicinity of one of the partitions, showing the accelerated pitch of the helical rail in order to carry the cans quickly from one compartment to the next.

The apparatus here shown is a box or shell in which the can path is, in general, of a type now well known and comprises a fixed helically directed rail, and a rotating reel of rails inside the helical rail and parallel with its axis. The reel rails are of some type of angle section so that when properly relatively disposed, they and the helical rail form a continuous helical path through which the cans are conveyed positively from the inlet to the outlet.

1 is the box or shell fluid-tight and adapted to receive and confine the media required to impart the necessary temperatures and pressures at the several stages of operation, as will be presently described.

Within the shell in its region of inner circumference is suitably mounted on longitudinal stringer-rails 1′, a fixed helically directed rail 2, which is preferably of T-section with its leg portion projecting inwardly.

3 is a rotatable shaft mounted in and extending through the shell in its axis.

Fixed upon this shaft are three pairs of spaced spiders 4, each pair carrying between their rims the circumferentially disposed spaced reel rails 5, thereby forming three reels, rotating in unison, the rails of the reels being alined. These rails are best of angle-section and they lie and rotate within the helically directed rail 2 in such relation thereto that a can introduced at one end of the shell will lie between the rails and will be directed thereby, by the rotation of the reels, throughout a continuous helical path to the other end of the shell.

Within the shell are two partitions 6, Fig. 1. These occupy the full cross section of the shell, except at the upper portion, where as shown in Figs. 1 and 2, they terminate short of the upper arc of the shell, thereby forming three distinct compartments, which in Fig. 1 I have, for convenience, indicated by A, B and C, said compartments successively communicating over the tops of the partitions.

In order to make the can path as long as possible, the general pitch of the helically directed fixed rail 2 is at a relatively slight angle as indicated in Fig. 3, but as it is required that the can be advanced from one compartment to the other over the top of the partition, it is necessary in the short time the can is in this upper position, to move it more rapidly, so that it may safely cross the partition. Therefore, the pitch of the fixed rail, in the region over the partitions, is accelerated materially, as is indicated at 2' in Figs. 1 and 3, whereby the can is moved rapidly through the communications between the compartments, thus conforming the time to the space available.

Figure 5:
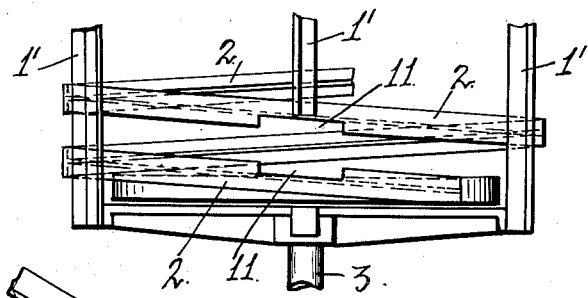
Fig. 5 is a top plan view of a detail showing the cuts in the helical guide rail to admit the cans from the feed valve to the reel.
Figure 4:
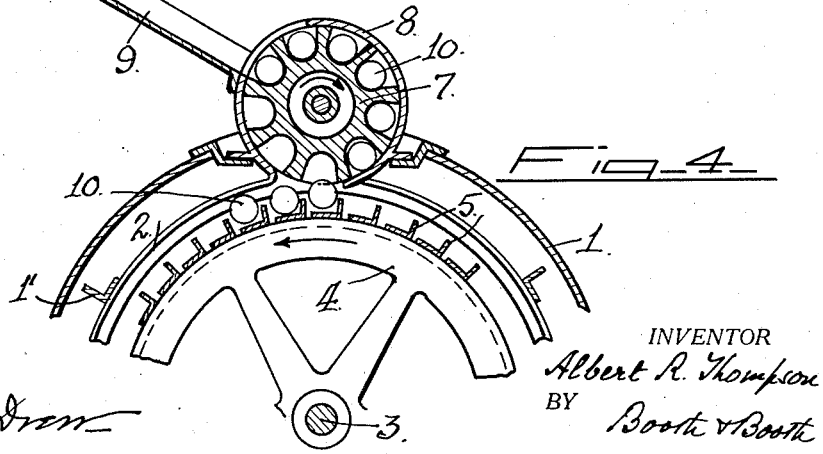
Fig. 4 is a section on the line 4—4 of Fig. 1.

In Figs. 1 and 4, I have shown a simple form of fluid tight feed valve, comprising a rotating pocket wheel 7 housed in a shell 8, with which a feed chute 9 communicates. This housing communicates with the rotating reel rails of compartment A, the cans indicated by 10, in Fig. 4, successively dropping from the pockets of the valve wheel 7, through a cut out portion at 11, shown in Fig. 5, of the fixed rails 2, onto the reel rails 5 successively.

Figure 6:
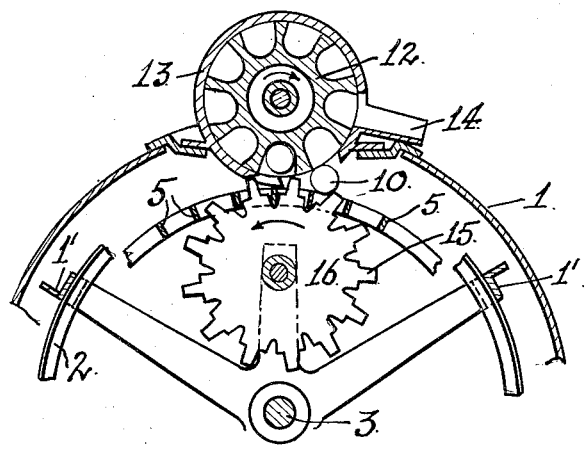
Fig. 6 is a sectional detail on the line 6—6 of Fig. 1.

Similarly, I have shown in Figs. 1 and 6 a fluid tight discharge valve comprising a pocket wheel 12 in a housing 13 from which a chute 14 leads—Fig. 6. The cans 10 are delivered to the pockets of the valve wheel 12 by being lifted from their reel rails 5 by the pusher teeth 15 of a pair of rotating disks 16. These disks are rotated gearwise by the engagement of their teeth with the rails of the rotating reel, as seen in Fig. 6.

In the compartments or regions A and B is a heating medium. This is here indicated by a body of water $a$ in compartment A, and a body of water $b$ in compartment B. These water bodies are heated by perforated steam pipes 17 and 17' respectively. In compartment C is a cooling medium indicated by a body of water $c$, said medium being supplied by a pipe 17''.

18 is a pipe which leads from a source of air under pressure, indicated by 19, which may represent an air pump. Pipe 18 leads into the top of the shell 1, and is controlled by a cock 19'. A pressure gauge 20 indicates the pressure within the shell, and this pressure is equal in all the compartments. The reel shaft 3 is driven from suitable power, not shown, and from this shaft, by a gear train 21 on one end, the feed valve-wheel 7 is driven, and by a gear train 22 on the other end the discharge valve 12 is driven.

In carrying out my method, I first establish a predetermined pressure in the shell by means of the air introduced, and I raise the temperature in compartment A to a degree predetermined by length of time the cans take to pass through said compartment and the degree of heat required for the sterilization of their contents. The temperature of this initial region, in general terms, should be higher than that required for sterilization, in order to rapidly raise the temperature of the can contents to the required degree; and as this temperature is reached the cans are ready to pass into the next heat region or compartment B. In this latter region, the sterilizing temperature is maintained constant throughout the course of the cans therethrough, so that by the time the cans are passing into the third compartment or region C, their time of cook is complete. In this region C, a cooling temperature is maintained until, as the cans are discharged, they are sufficiently cooled. Thus in all three regions the temperature differs and though these regions communicate and form a single integral inclosure, all are under the same pressure, which serves the double purpose of preventing the interchange of heat between the communicating regions, and of keeping the cans under pressure during the cooling effect.

As a concrete example of my method I give the following: Taking canned corn as the commodity to be sterilized, I would maintain a gauge pressure of say 20 pounds in the shell. In region A I would have a temperature of 260 degrees F. and would raise the temperature of the cans in said region to 255 degrees F. in about seven or eight minutes. In region B I would maintain a temperature of 255 degrees F. during the entire travel of the cans therethrough; and in region C, I would have a cooling temperature of say 100 degrees F. or less. This is merely by way of illustration, as different commodities will require different pressures and temperatures.

I claim:—

1. The method of sterilizing canned goods which comprises introducing them initially to a region in which the temperature is higher than that required for sterilization and keeping them therein until they have been raised to said sterilizing temperature; and then at once transferring them into a second region communicating with the first region and in which the temperature is maintained constant at that required for sterilization and keeping them therein until sterilized.

2. The method of sterilizing canned goods which comprises introducing them initially to a region in which the temperature is higher than that required for sterilization and keeping them therein until they have been raised to said sterilizing temperature; and then at once transferring them into a second region communicating with the first region and in which the temperature is maintained constant at that required for sterilization and keeping them therein until sterilized, both regions being under pressure higher than atmospheric.

3. The method of sterilizing canned goods which comprises introducing them initially to a region in which the temperature is higher than that required for sterilization and keeping them therein until they have been raised to said sterilizing temperature; and then at once transferring them into a second region communicating with the first region, and in which the temperature is maintained at that required for sterilization and keeping them therein until sterilized, the transfer of heat from one region to the other through their communications being prevented.

4. The method of sterilizing canned goods which comprises introducing them initially to a region in which the temperature is higher than that required for sterilization and keeping them therein until they have been raised to said sterilizing temperature; and then at once transferring them into a second region communicating with the first region and in which the temperature is maintained at that required for sterilization and keeping them therein until sterilized, both regions being under pressure higher than atmospheric, and the transfer of heat from one region to the other through their communication being prevented by said pressure.

5. The method of sterilizing canned goods which comprises introducing them initially to a region in which the temperature is higher than that required for sterilization and keeping them therein until they have been raised to said sterilizing temperature; then at once transferring them into a second region communicating with the first region and in which the temperature is maintained at that required for sterilization and keeping them therein until sterilized; supplying the heat to both regions through a heated liquid medium; and establishing fluid pressure in both regions on said liquid medium, whereby interchange of heat between the regions is prevented.

6. The method of sterilizing canned goods consisting in introducing the goods initially to a region in which the temperature is higher than that required for sterilization and keeping them therein until they have been raised to said sterilizing temperature; then at once transferring them into a second region communicating with the first region and in which the temperature is maintained at that required for sterilization and keeping them therein until sterilized; and then at once transferring them into a third region communicating with the second region and in which a cooling temperature is maintained, all of said regions being kept under pressure above atmospheric and said pressure utilized to prevent interchange of heat between the regions.

7. The method of sterilizing canned goods consisting in introducing the goods initially to a region in which a temperature higher than that required for sterilization is supplied by a heated liquid medium included in said region and keeping them therein until they have been raised to said sterilizing temperature; then at once transferring them into a second region communicating with the first region and in which a temperature is supplied and maintained at that required for sterilization, by a heated liquid medium included in said region and keeping them therein until sterilized; then transferring them at once into a third region communicating with the second region and in which a cooling temperature is supplied and maintained by a liquid medium included in said region; and maintaining fluid pressure above atmospheric within each region whereby interchange of heat between the regions is prevented.

8. A process of heat-treating materials in sealed receptacles which consists in heating liquid in a closed container to a temperature higher than the temperature at which it boils in the atmosphere surrounding the container, preventing ebullition of the liquid by a fixed gas held under pressure within the container above the liquid, passing the sealed receptacles continuously through the heated liquid and through a cooling fluid within the container while still maintaining said receptacles under the same pressure of said fixed gas.

9. A process of heat treating objects in a fluid tight container divided into a plurality of communicating chambers containing liquid, which consists in maintaining the liquid in different chambers at different temperatures, respectively, maintaining a fixed gas under pressure within said container, introducing objects to be treated into said container, moving said objects through the several chambers in succession, thereby subjecting them successively to treatment in the liquid of different temperatures, and finally removing the treated objects from the container.

10. The process of heat-treating materials in sealed receptacles which consists in heating said sealed receptacles in a liquid bath within a fluid tight container, said bath being heated to a temperature higher than the temperature at which the liquid boils in the atmosphere surrounding the container, preventing ebullition of the liquid by a fixed gas held under pressure within the container above the liquid, and cooling the sealed receptacles within the container while still maintaining them under the same pressure of the said fixed gas.

11. The method of sterilizing canned goods consisting in introducing the goods initially to a region in which the temperature is higher than that required for sterilization and keeping them therein until they have been raised to such temperature; then at once transferring them into a second region communicating with the first region and in which the temperature is maintained at that required for sterilization and keeping them therein at such temperature until they are sterilized; and then at once transferring them into a third region communicating with the second region and in which a cooling temperature is maintained.

In testimony whereof I have signed my name to this specification.

ALBERT R. THOMPSON.